UNITED STATES PATENT OFFICE.

N. C. SZERELMEY, OF PIMLICO, GREAT BRITAIN.

IMPROVEMENT IN THE MANUFACTURE OF PAPER BOARDS, PIPES, &c.

Specification forming part of Letters Patent No. 54,082, dated April 17, 1866.

*To all whom it may concern:*

Be it known that I, NICHOLAS CHARLES SZERELMEY, of 90 Belgrave Road, Pimlico, in the county of Middlesex, gentleman, a subject of the Queen of Great Britain, have invented or discovered certain new and useful Improvements in the Manufacture of Paper Boards and Pipes; and I, the said NICHOLAS CHARLES SZERELMEY, do hereby declare the nature of the said invention and in what manner the same is to be performed to be particularly described and ascertained in and by the following statement thereof—that is to say:

Heretofore in the manufacture of paper boards and paper pipes they have been made by pasting or by otherwise cementing several layers or thicknesses of paper together, and in some cases the paper so used has been saturated or combined with tar.

Now, according to my invention, the paper employed is first prepared by being saturated by one or other of the three compounds hereinafter mentioned, and the sheets or pieces of paper are then combined or cemented together in any number of layers, according to the purpose to which the boards or pipes are to be applied, by means of a cementing compound composed of the following substances or matters mixed together in about the following proportions, viz: one ton of coal-tar; one ton of French siccative; half a hundred-weight of zopissa, which is found in Arabia and also in America; one hundred-weight of fibrous pulp, such as is used in making paper; one hundred-weight of glue dissolved in sixty gallons of water.

In preparing this compound the coal-tar is heated to a boil, the French siccative and the zopissa are stirred in and mixed, then the pulp and glue are added, and all are well combined.

In preparing the paper which is to be used according to my invention, if it be very soft and very porous, I saturate it with a solution of the following salts: one part, by weight, of chloride of calcium; one part, by weight, of acetate of lime; twenty parts of water.

If the paper is less soft and less porous I saturate it with a solution composed as follows: silicate of potash and artificial sulphate of baryta in equal parts, in about sixteen parts of water.

These two solutions may be applied in succession to the same paper in those cases where the paper, after being saturated with the first solution, is found, after being dried, still capable of absorbing water.

Other papers are saturated with the following compound: anhydrous gypsum and caustic potash in equal parts or proportions, in about ten parts of water. The paper, having been well saturated in either of these compounds or solutions, is, when dry, suitable for carrying out my invention, and any number of sheets or layers may be cemented or combined together by the compound above described, which is spread over the surfaces of the prepared paper in like manner to that in which paste or other cements have been used in producing paper boards and paper pipes.

In the above description I have been precise in giving the proportions of the materials as used by me. I do not, however, confine myself to the precise quantities or proportions.

What I claim is—

The manufacture of paper boards and paper pipes by combining suitable paper in layers by means of a composition or cement consisting of tar, French siccative, zopissa, and glue, substantially as herein described.

N. C. SZERELMEY.

Witnesses:
  G. F. WARREN,
  JOHN DEAN,
*Both of No. 17 Gracechurch Street, London.*